United States Patent [19]
Shea

[11] Patent Number: 4,776,234
[45] Date of Patent: Oct. 11, 1988

[54] MODULATING BIAS CONTROL FOR LIMITED SLIP DIFFERENTIAL AXLE

[75] Inventor: Dennis W. Shea, Toledo, Ohio

[73] Assignee: Dana Corporation, Toledo, Ohio

[21] Appl. No.: 841,653

[22] Filed: Mar. 20, 1986

[51] Int. Cl.$^4$ .................... F16H 1/44; F16D 19/00
[52] U.S. Cl. ............................ 74/710.5; 192/93 C
[58] Field of Search .................. 74/710.5, 711, 713; 192/35, 93 C

[56] References Cited

U.S. PATENT DOCUMENTS

| 2,394,085 | 2/1946 | Loughridge | 74/711 X |
| 3,133,454 | 5/1964 | Padlo | 74/710.5 |
| 3,149,706 | 9/1964 | Mason et al. | 192/35 |
| 3,732,752 | 5/1973 | Louckes et al. | 74/710.5 |
| 3,845,671 | 11/1974 | Sharp et al. | 74/710.5 |
| 4,048,872 | 9/1977 | Webb | 74/710.5 X |
| 4,550,817 | 11/1985 | Euler | 192/93 C |
| 4,574,656 | 3/1986 | McCarthy et al. | 74/710.5 X |

FOREIGN PATENT DOCUMENTS

| 2920107 | 11/1980 | Fed. Rep. of Germany | 74/711 |
| 3402918 | 2/1985 | Fed. Rep. of Germany | 74/711 |
| 178040 | 10/1983 | Japan | 74/710.5 |
| 1155889 | 6/1969 | United Kingdom | 74/711 |

Primary Examiner—Leslie Braun
Assistant Examiner—James W. Innskeep
Attorney, Agent, or Firm—Frank B. McDonald

[57] ABSTRACT

A limited slip differential axle assembly includes a plurality of pressure plate segments which are electromagnetically biased against friction discs of clutch packs secured to side gears of the differential. In a preferred form, the assembly is formed of a two-piece of "split" differential case and includes an armature ring rigidly coupled to a pressure plate loading ring. Electromagnetic coupling forces are adjustably controlled by a vehicular operator to permit modulation of bias for given road conditions, wherein a limited slip differential control may be effective to bias a clutch pack to provide a variable friction drag between at least one of the side gears and the differential case. For this purpose, an energizing coil is secured rigidly to the differential carrier, while a magnet shell member is rigidly affixed to one part of the split differential case. The armature ring cooperates with the magnet shell to form an air gap, the armature ring being threadably and hence adjustably secured to the loading ring disposed between the two relatively moveable parts of the split differential case.

13 Claims, 2 Drawing Sheets

MODULATING BIAS CONTROL FOR LIMITED SLIP DIFFERENTIAL AXLE

BACKGROUND OF THE INVENTION

This invention relates to limited slip differential axle assemblies of the type including clutch packs for improved traction over a variety of driving conditions. More particularly, the invention relates to a bias control mechanism wherein the effectiveness of the clutch packs may be modulated from zero or full differentiation to maximum or full axle lock-up. The mechanism is electromagnetically and variably controllable by a vehicle operator, preferably from a vehicle control panel or dashboard.

A number of prior art mechanisms provide for bias control of differential axles through clutch packs which provide limited slip action for improved traction in slippery or generally non-dry road conditions. One of such devices provides a variable bias clutch pack which tends to respond more quickly than most conventional types of clutch packs. Another device provides for both zero and full differentiation modes, with a conventional clutch pack limited slip capability in a third mode. However, the latter cannot be modulated. In fact, this inventor is not aware of any modulating bias control systems providing for variation in degree of limited slip action. Such a system would permit choices of specific amounts of bias suitable for a variety of driving situations. The vehicle operator would thus be able to achieve a more desirable and safer operation.

The limited slip differential axle assembly disclosed herein provides a means for bias control at the choice and selection of a vehicle operator over an infinite range of control from zero and no bias through intermediate ranges of bias to full bias or complete axle lock-up.

In a preferred form, the limited slip differential axle assembly includes an electromagnetically actuated coil rigidly affixed to the differential carrier, and oriented radially about the driving axle shafts. Relatively rotatable with respect to the coil is a magnet shell which is rigidly affixed to one part of a two part differential case. The other part of the case supports a loading ring to which an armature is threadably secured to provide an adjustable air gap for control of electromagnetic flux. A differential clutch pack provides two sets of interleaved friction discs, a first set rigidly affixed to one of the side gears of the differential, while the second set forms a part of one of the portions of the two-part differential case.

When the coil is energized, magnetic flux attracts the armature, and will thus tend to pull same toward the magnet shell. This action will result in the loading ring urging a plurality of pressure plate segments against the clutch pack to bias the side gear under a controllable amount of friction drag with respect to the differential case.

By controlling intensity of the electromagnetic flux, preferably from a control panel, an operator will be able to mdoulate bias for any given road condition, ranging from complete lack of bias to achievement of full bias.

DETAILED DESCRIPTION OF THE PREFERRED EMBODIMENTS

Figure 1:
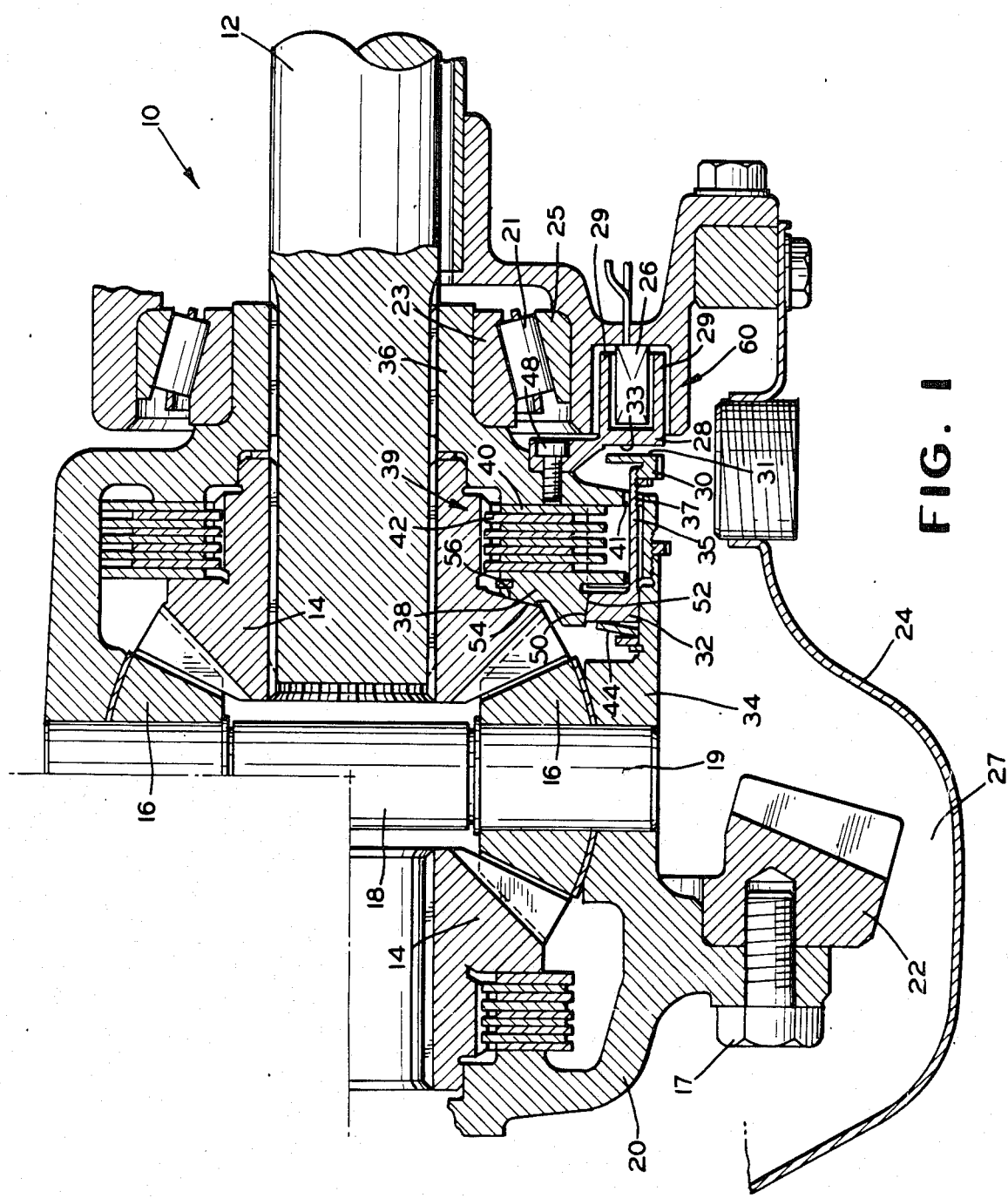
FIG. 1 is a fragmentary sectional view of a limited slip differential axle assembly which contains a preferred embodiment of the present invention.

Referring initially to FIG. 1, a fragmentary cross-sectional view of a differential axle assembly 10 is shown. The assembly includes a pair of axle shafts 12, only one of which is shown. Each of the axles 12 contains a side gear 14 which is driven by a pair of pinions 16. The pinions mesh with the side gears 14, and are relatively rotatable about a cross pin member 18, which is rigidly secured at its ends 19 to a differential case 20.

A ring gear 22 is rigidly secured to the differential case 20 by means of fasteners 17. The ring gear is rotated by a drive pinion affixed to a drive shaft (neither shown) for direct rotatable driving engagement.

A carrier 24 provides an external housing about the differential case 20, and includes an oil carrier sump 27 for purposes of lubricating the mating ring gear and drive pinion. A set of roller bearings 21, having inner and outer races 23 and 25, respectively, support rotation of the case 20 within the carrier 24.

The present invention provides a bias control apparatus 60 for a limited slip differential axle. A first preferred embodiment of the device is incorporated in the differential axle assembly 10 of FIG. 1. It should be pointed out that this invention relates to a system for providing variable loading of a clutch pack in order to increase or decrease frictional bias at the choice of an operator of a vehicle. It is envisioned that such load control may be achieved hydraulically or mechanically, as well as electromagnetically, although both preferred embodiments disclosed herein utilize only electromagnetic control apparatus. Thus, a stationary electromagnetic coil 26 is rigidly mounted to the carrier 24 as shown. An annular magnet shell 28 is rotatable about the coil 26. The shell 28 contains a pair of spaced annuli 29 which are surroundingly positioned with respect to the coil 26 to enhance flux generation. Although the preferred practice of the present invention utilizes one control apparatus 60 on each axle shaft 12, for convenience only one such apparatus is shown and described herein.

In the preferred embodiment described, the differential case 20 is of a two piece construction, having an exterior portion 34 and an interior portion 36 as shown. The magnet shell 28 is affixed to and rotatable with the interior portion 36 of the differential case 20 by fastener members 48. Intermediate the exterior and interior portions 34 and 36 is a loading ring 32, which is supported within the annular body of the exterior portion 34 for relative axial movement with respect thereto. For this purpose, a preload spring 44 is anchored between the loading ring 32 and the exterior portion 34 as shown.

The loading ring 32 contains a cylindrical extension 35 having a threaded portion 37 to which an armature 30 is threadably, hence adjustably, secured. Thus the face 31 of the armature 30 may be adjusted axially with respect to the rear surface 33 of the magnet shell in order to control an air gap between the magnet shell and the armature. In the described preferred embodiment, the air gap should be within a range of 5 thousandths to 45 thousandths of an inch in diameter in an unloaded or nonenergized portion.

In a preferred form, the extension 35 comprises legs which extend through slots 41 in the interior portion 36. The slots enable the ring 32 to be rotated by the interior portion, while allowing relative axial movement of the legs 35 within the portion 36.

A pressure plate mechanism 38 is formed as a plurality of segments which register with and are circumferentially positioned about the interior portion 36 of the case 20. The pressure plate segments are disposed for being urged against a clutch pack 39 comprised of two interleaved sets of friction discs 40 and 42. The discs 40 are splined to the interior portion 36 of the differential case, while the discs 42 are splined to the side gear 14.

As will be appreciated by those skilled in the art, whenever the coil 26 is energized, the armature 30 will be attracted to the rear face 33 of the magnet shell by virtue of the magnetic flux field established upon energization of the coil. As a result, the armature will be pulled rightwardly (as viewed in FIG. 1), causing a sliding angular ramp surface 50 of the loading ring 32 to bear axially against mating or cooperating surfaces 52 on the plurality of segments 38 positioned with the interior portion 36 of the differential case. The pressure plate segments 38 bear against the clutch pack 39 whenever the coil 26 is energized. In the preferred embodiment, there are six segments 38 uniformly spaced circumferentially about the axle shaft 12. As the surface 50 cams against the individual segment surfaces 52, the pressure plate segments 38 are displaced radially inwardly, as well as axially rightwardly, as viewed in FIG. 1. A side gear mating surface 54 formed on each pressure plate segment 38 cooperatively mates with the rear surface of the side gear 56. The overall effect is to uniformly cam the pressure plate segments against the clutch pack 39 under a force which can be modulated by a variably controlled electromagnetic flux field.

Although not shown as earlier noted, in the preferred embodiment, there are two of such bias control assemblies 60, one on each side of the differential axle assembly 10. Although it may be more effective to provide bias control on both sides and hence with respect to both half axle shafts 12 than to control only one of such axle shaft members, the invention as herein described and claimed is nonetheless applicable to the use of only one of such assemblies 60.

The present invention contemplates the use of a dial control knob, preferably on the operator's control panel for modulating the bias control from a zero value, or no bias, to complete axle lock-up or full bias, including the range selection of an infinite member of intermediate bias values as well. The preload spring 44 is preferably an extremely light preload, and one which will permit a zero bias or open differential condition whenever the coil 26 is fully de-energized. Hence the operator will effectively select varying values of preload on the clutch pack by means of the bias control assembly. At varying degrees of energization of the coil 26, there will be varying degrees of bias available to the vehicular operator, for selective modulation according to road conditions.

Figure 2:
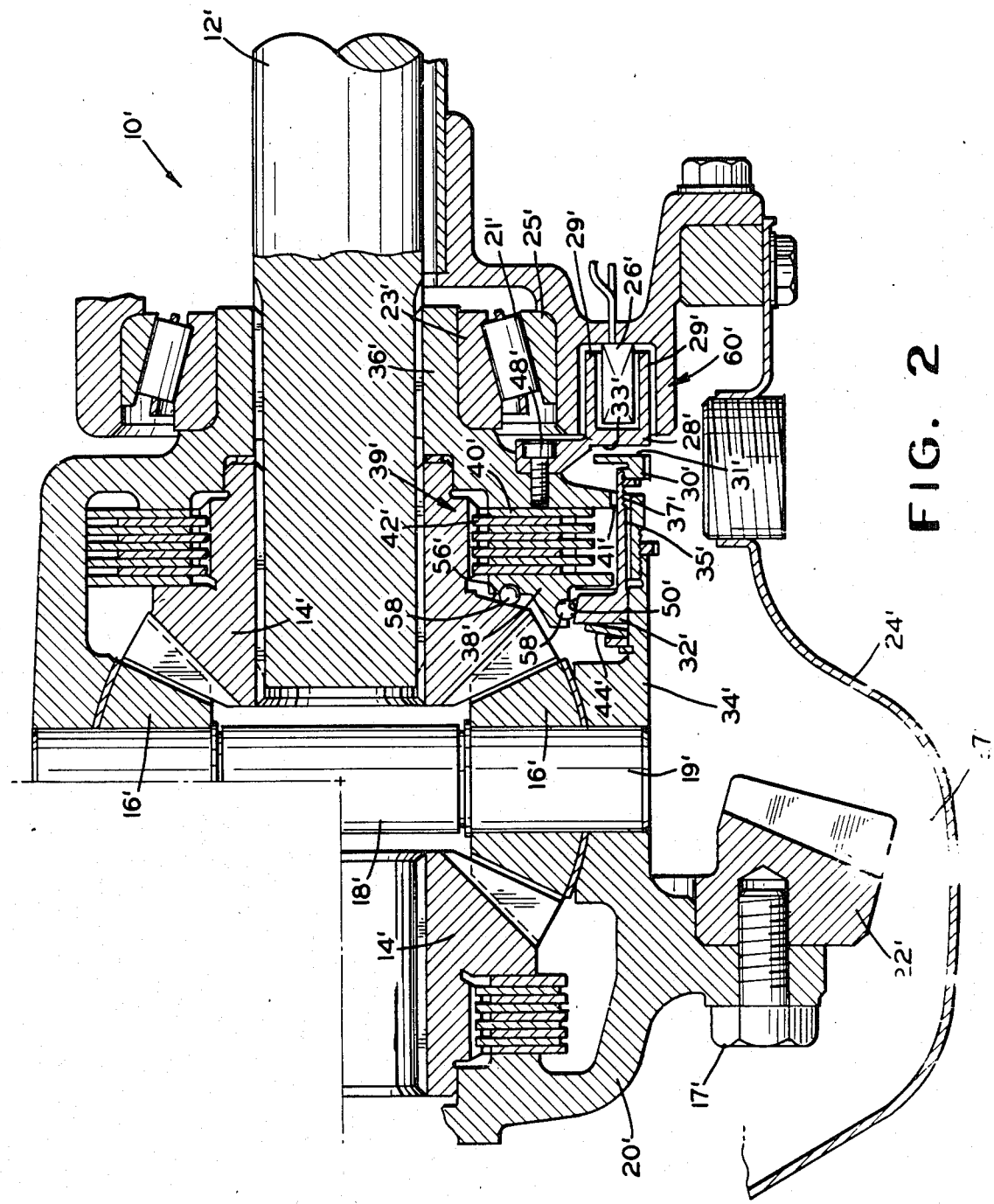
FIG. 2 is a fragmentary sectional view of an alternate preferred embodiment of the present invention.

Finally, referring to FIG. 2, an alternate embodiment is shown at 10' which utilizes balls 58 in lieu of the sliding surfaces 52 and 54 of the pressure plate segments 38. In all other respects, the embodiment of FIG. 2 is identical to that of FIG. 1.

Those skilled in the art will recognize the numerous practical advantages of the present invention. For example, the driver of a vehicle is now able to select a relatively high bias for initiating vehicular movement under conditions of poor traction. Conversely, he is able to select a lower bias value for improved vehicular handling at relatively high speeds under slippery driving conditions, a potentially serious problem for conventional clutch packs.

In addition, the system control can be automatically sensing and actuating without requiring driver intervention under changing road conditions. One example of such a sensing control system is being utilized in the new generation of antiskid brakes.

Although only two preferred embodiments have been shown and described herein, the following claims are envisioned to cover numerous other embodiments which fall within the spirit and scope thereof.

What is claimed is:

1. In a limited slip differential axle assembly for use in a vehicle, said assembly including a carrier, a differential case rotatably mounted in said carrier, a pair of pinions mounted for rotation within said case, first and second side gears engaged with each of said pinions, a first plurality of friction discs fixed to said first side gear and interleaved with and disposed for engaging a second plurality of mating discs fixed to said case; an improvement comprising means for modulating a preload force between said first plurality of friction discs and said second plurality of said discs, said means located between said first side gear and said pluralities of interleaved discs, said means including a plurality of pressure plate segments annularly disposed against at least one of said friction discs, said segments comprising cam surfaces disposed to urge said segments both radially and axially with respect to said friction discs and said first side gear as said preload force is changed.

2. In a limited slip differential axle assembly for use in a vehicle, said assembly including a carrier, a differential case rotatably mounted in said carrier, a pair of pinions mounted for rotation within said case, and a pair of side gears containing a first plurality of friction discs fixed to one of said side gears and disposed for engaging a second plurality of mating discs fixed to said case; an improvement comprising means for electromagnetically biasing said first plurality of friction discs against said second plurality of mating discs, said means comprising a variably adjustable control apparatus, whereby an operator may selectively modulate bias for given road conditions, said adjustable control apparatus including a plurality of pressure plate segments located between said first side gear and said pluralities of discs and disposed for biasing together said first and second pluralities of friction discs, said apparatus further comprising a pressure plate loading ring, said ring and said segments containing mating cam surfaces, said ring being axially modulated by said electromagnetic means, whereby as said ring moves axially said pressure plate segments are disposed for movement both radially and axially with respect to said friction discs via the interaction of said mating cam surfaces.

3. The limited slip differential axle assembly of claim 2 wherein said variably adjustable control apparatus comprises means for achieving a range extending from a zero bias condition of fully free differentiation to a full bias condition of zero differentiation.

4. The limited slip differential axle assembly of claim 3 wherein said control apparatus comprises an armature ring and a loading ring including a threaded portion thereon, said armature ring being threadably secured to said loading ring for adjustment thereon.

5. The limited slip differential axle assembly of claim 4 further comprising an annular magnet shell fixedly secured to said differential case, said armature and said magnet shell spaced apart to define an air gap.

6. The limited slip differential axle assembly of claim 5 further comprising an energizing coil fixed to said carrier, and registering with said rotatable magnet shell through said air gap.

7. The limited slip differential axle assembly of claim 6 wherein said magnet shell defines a pair of annuli surroundingly positioned with respect to said energizing coil, and in close registration therewith for establishing flux therethrough upon energization of said coil, said flux being modulated as a function of the intensity of the energization of said coil.

8. The limited slip differential axle assembly of claim 7 further comprising a preload spring, said spring being juxtaposed between said loading ring and said differential case.

9. The limited slip differential axle assembly of claim 8 wherein said armature may be adjustably positioned at the threaded portion of said loading ring to adjust said air gap between said magnet shell and said armature.

10. The limited slip differential axle assembly of claim 9 wherein said differential case comprises two parts; a first part circumferentially supporting a second part through said loading ring, said second part containing said plurality of pressure plate segments which bear axially against said set of friction discs, said friction discs being interleaved, the first plurality of said discs being splined to said side gears, the second plurality of said discs being splined to said second part of said differential case.

11. The limited slip differential axle assembly of claim 9 wherein said magnet shell is rigidly affixed to said second part of said split differential case, and wherein said cams of said pressure plate segments are defined by balls.

12. The limited slip differential axle assembly of claim 11 whereby said preload spring anchored against said first portion of said split differential case and biased against said loading ring to force said pressure plate segments against said friction discs splined to said side gear.

13. In a limited slip differential axle assembly for use in a vehicle, said assembly including a carrier, a differential case rotatably mounted in said carrier, a pair of pinions mounted for rotation within said case, first and second side gears engaged with each of said pinions, a first plurality of friction discs fixed to said first side gear and disposed for engaging a second plurality of mating discs fixed to said case; an improvement comprising means for modulating a preload force between said first plurality of friction discs and said second plurality of said discs, said means including a plurality of pressure plate segments annularly disposed against said friction discs, said segments comprising cam surfaces disposed to urge said segments both radially and axially with respect to said friction discs as said preload force is changed, said axle assembly further comprising a system control which automatically senses and actuates said means for modulating without requirement of driver intervention.

* * * * *